United States Patent Office 2,993,889
Patented July 25, 1961

2,993,889
SEPARATION OF A LACTAM FROM AN ACID REACTION MIXTURE

Mathias J. G. Muytjens and Henri J. H. Simon, Geleen, Netherlands, assignors to Stamicarbon N.V., Heerlen, Netherlands
No Drawing. Filed Oct. 5, 1959, Ser. No. 844,188
Claims priority, application Netherlands Oct. 9, 1958
5 Claims. (Cl. 260—239.3)

The present invention relates to a process for the separation of a lactam from an acid reaction mixture. This is usually the reaction mixture in which the lactam has been formed by Beckmann rearrangement of the corresponding oxime in a strong inorganic acid, such as sulphuric acid or phosporic acid. According to a well-known process this acid reaction mixture is neutralized by addition of a base, after which the lactam-containing layer, which has formed as a top layer during neutralization, is separated off and subsequently extracted by means of an organic solvent.

In the above described process, a bottom layer is formed containing a large amount of an inorganic salt, for instance ammonium phosphate or ammonium sulphate, which can be used as a fertilizer, the salt being obtained from the bottom layer by crystallization. Generally speaking, however, these salts do not sell easily, because they are not sufficiently white. On the other hand, the lactam separated off according to the known process also contains large amounts of impurities, so that further purification of this lactam is comparatively costly.

It has previously been suggested (see U.S. Patent 2,817,661) to concentrate the top layer containing approximately 65% lactam to a lactam content of 80–90% by weight, before extracting it with an organic solvent. However, this method is objectionable in that concentrating to a lactam content of 80–90% by weight requires extensive and costly apparatus. Moreover, this known method has the drawback that during the extraction, tarlike constituents are sometimes separated out. When using the conventional open type of extraction apparatus, e.g. so-called mixer-settler apparatus, it is possible, although with great difficulty, to scoop out the tarlike constituents. However, this tendency for tarlike constituents to separate out makes it practically impossible to use a more modern closed type of extraction apparatus, such as a rotating disc column or a pulsating extraction column. Moreover, it has been found that the inorganic salt which is obtained with this method is often not sufficiently white.

The present invention has for its principal object the provision of a process which is free from the above noted disadvantages. A more particular object of the invention is to provide a process which permits the use of modern equipment for carrying out the extraction. Further objects and advantages of the present invention will be hereinafter apparent.

According to the invention, the process for separating lactam from an acid reaction mixture, in which the acid reaction mixture is neutralized, and the resulting lactam-containing top layer is subsequently separated off and extracted with an organic solvent, is characterized in that the acid reaction mixture is only neutralized to such an extent that the pH of the bottom layer does not exceed 5.5, preferably not above 4.7, and the lactam-containing top layer, after it has been separated off, is further neutralized before or during the extraction to such an extent that the pH of the aqueous phase thereof remains over 5.0 throughout the extraction.

If in contradistinction to the present process, the lactam-containing top layer is separated off at a pH higher than 5.5, an inorganic salt is obtained which is not sufficiently white. In such case, another disadvantage is also encountered, in that a more extensive apparatus is required for the further extraction.

The following theory is advanced as a possible explanation for the unexpected results of the invention although it will be understood that the invention is not limited to this particular theory:

The acid reaction mixture contains impurities which upon an increase in pH may at least partly act as surface-active substances. When the pH of the bottom layer is below 5.5, part of these impurities are contained in the lactam-containing top layer while in the case of a pH higher than 5.5, these impurities are largely contained in bottom layer, i.e. the inorganic salt solution. Consequently, if the two layers are separated off at a pH higher than 5.5, part of these impurities get into the inorganic salt solution, with the result that on the one hand they may cause coloration of the inorganic salt, while on the other hand they cannot act as surface-active substances during the extraction process. If according to the invention, the two layers are separated off at a pH lower than 5.5 and the pH is increased before or during the extraction by adding a base, for instance ammonia, the said impurities act as surface-active substances as a result of which the contact between the two phases in the separated top layer improves during the extraction. If the lactam-containing top layer, separated off at a pH lower than 5.5, should be subjected to the extraction process without further neutralization, the impurities cause the above-mentioned formation of tarlike constituents.

During the extraction, the pH of the water phase drops. It is, therefore, necessary to neutralize the water-containing lactam layer before or during the extraction in such a measure that the pH remains higher than 5.0 throughout the extraction. If this is not done, the pH of the aqueous phase on completion of the extraction will be too low, so that tarlike substances will still form in the aqueous phase.

Preferably the process according to the invention is carried out in such a way that before or during the extraction, the lactam-containing top layer is neutralized to an extent such that the pH of the aqueous phase thereof remains between 7 and 8 during the extraction. At a pH higher than 7, the surface-active effect of the said impurities is greater. A pH above 8 may be used but to obtain such higher pH, a comparatively large amount of base is necessary.

The present process is particularly suitable for use with modern closed-type extraction apparatus since no tarlike constituents deposit. Preferably, the extraction is carried out using a rotating disc column of conventional structure.

If desired, a solution of an inorganic salt may be added to the separated top layer during the extraction. For instance, a portion of aqueous inorganic salt solution previously separated off may be added to the top layer. This results in a salting-out effect so that a smaller type of extraction apparatus may be used. However, it has been found that by adding such a salt solution during the extraction, the quality of the resulting lactam may be somewhat lessened. Accordingly, the advantage to be gained from this salting-out feature must be weighed against the possible disadvantage thereof in order to decide whether or not inorganic salt should be added during the extraction in any particular case.

For present purpose, a wide variety of bases may be used to maintain the desired pH conditions both before separation of the top and bottom layers and subsequent extraction of the lactam from the top layer. Preferably, ammonia is used for this purpose. The ammonia may be gaseous or liquid, as such, or in aqueous solution. Other bases suitable for use herein include: sodium hydroxide and potassium hydroxide.

Extraction of the lactam-containing top layer may be carried out with any of the solvents usually used for this purpose. Thus, for example, benzene or other hydrocarbons may be used, typically toluene, chloroform or mixtures of benzene and cyclohexane.

The following examples serve to illustrate the invention without restricting the same.

*Example 1*

A reaction mixture obtained by Beckmann rearrangement of cyclohexanone oxime with sulphuric acid is, with intensive stirring, neutralized with ammonia until the bottom layer has a pH of 4, measured with a glass-calomel electrode. A two-layer system is obtained, the top layer of which consists of about 65% caprolactam, about 1% ammonium sulphate and about 34% water. The bottom layer comprises an approximately 40% aqueous solution of ammonium sulphate, which also contains a small amount of caprolactam. This small amount of caprolactam may be removed from this aqueous layer by treatment with benzene.

To the separated top layer, ammonia is added and this layer is subsequently extracted in a rotating disc column, at 20° C. with the lactam-containing benzene obtained in the treatment of the bottom layer. The length of the column is 440 cm. and the diameter 6.5 cm. The rotating speed is 475 r.p.m. The top layer is lead into the column at the rate of 10 litres per hour and the benzene at the rate of 30 litres per hour.

The aqueous phase leaving the column base has a pH of 7.5 and a lactam content of 0.4%. After the column has been in use for 120 hours, it is found on inspection that the column does not contain any tarlike constituents. The extracted lactam is obtained in a highly desirable form.

*Example 2*

The process of Example 1 is repeated, but in such a way that, in contradistinction to the process according to the invention, no ammonia is added to the lactam-containing top layer after this has been separated off. In this case, the pH of the aqueous phase leaving the rotating disc is 3.5 and its lactam content about 2%. After 50 hours, the rotating disc column is put out of operation because the apparatus is completely fouled by tarlike constituents.

*Example 3*

The process of Example 1 is repeated except that this time before the separation of the top layer, the pH is increased to 7. Without further addition of ammonia, the lactam-containing top layer is extracted in the rotating disc column. In this case, the lactam content of the aqueous solution leaving the column is 2.5%. The ammonium sulphate obtained from the aqueous layer after the separation is considerably less white than the product obtained according to the two preceding examples.

While the foregoing examples are specific to the separation of caprolactam, it will be appreciated that the invention is not limited thereto. Thus, for example, the invention may also be used in the case of other lactams, for instance caprylolactam. The invention is also not restricted to lactam obtained by the Beckmann rearrangement of the corresponding oxime and is generally applicable to the separation of lactams from any type of acid reaction mixtures wherein two layers, one containing the lactam, are obtained as a result of neutralization. Thus, for example, in the case where 1-nitro-1-hydroxymethylcyclohexane is treated in an acid medium, the resulting lactam in an acid reaction mixture may be recovered by the process of the invention. It will also be recognized that the process of the invention is not restricted to the treatment of acid reaction mixtures containing sulphuric acid since the present process is also applicable in the cases where some other inorganic acid is used, for instance, phosphoric acid.

Having described in the invention what is claimed as new is:

We claim:

1. In a process for the separation of a lactam from an acid reaction mixture wherein the acid reaction mixture is neutralized and the resulting lactam-containing top layer is subsequently separated off and extracted with an organic solvent, the improvement which comprises neutralizing the acid reaction mixture to an extent such that the pH of the resulting bottom layer does not rise above 5.5, thereafter separating off the lactam-containing top layer, and further neutralizing said top layer to such an extent that the pH of the aqueous phase therein remains higher than 5.0 throughout the extraction.

2. The process of claim 1 wherein the top layer is further neutralized during extraction.

3. The process of claim 1 wherein the separated top layer is further neutralized before extraction.

4. The process of claim 1 wherein the acid reaction mixture is neutralized only to such an extent that the pH of the bottom layer does not rise above 4.7.

5. The process of claim 1 wherein the lactam-containing top layer, after it has been separated off, is neutralized to such an extent that the pH of the aqueous phase therein is 7 to 8 throughout the extraction.

References Cited in the file of this patent

UNITED STATES PATENTS

| | | |
|---|---|---|
| 2,605,261 | Kahr | July 29, 1952 |

FOREIGN PATENTS

| | | |
|---|---|---|
| 708,034 | Great Britain | Apr. 28, 1954 |
| 7,130 | Japan | Nov. 13, 1951 |
| 1,777 | Japan | May 20, 1952 |